United States Patent
Smith

(10) Patent No.: US 9,935,492 B2
(45) Date of Patent: Apr. 3, 2018

(54) POWER CONTROL SYSTEM AND METHOD FOR ADJUSTING AN INPUT POWER LIMIT OF A DC-DC VOLTAGE CONVERTER

(71) Applicant: LG Chem, Ltd., Seoul (KR)

(72) Inventor: Alexander Jeffrey Smith, White Lake, MI (US)

(73) Assignee: LG Chem, Ltd., Seoul (KR)

( * ) Notice: Subject to any disclaimer, the term of this patent is extended or adjusted under 35 U.S.C. 154(b) by 826 days.

(21) Appl. No.: 14/472,405

(22) Filed: Aug. 29, 2014

(65) Prior Publication Data

US 2016/0064927 A1    Mar. 3, 2016

(51) Int. Cl.
*H02J 7/34* (2006.01)
*H02J 7/00* (2006.01)
*B60L 11/18* (2006.01)

(52) U.S. Cl.
CPC ........... *H02J 7/345* (2013.01); *B60L 11/1868* (2013.01); *H02J 7/0065* (2013.01); *B60L 2210/12* (2013.01); *B60L 2210/42* (2013.01); *B60L 2240/545* (2013.01); *B60L 2240/547* (2013.01); *H02J 2007/004* (2013.01); *Y02T 10/7005* (2013.01); *Y02T 10/7066* (2013.01); *Y02T 10/7233* (2013.01); *Y02T 10/7241* (2013.01)

(58) Field of Classification Search
None
See application file for complete search history.

(56) References Cited

U.S. PATENT DOCUMENTS

| | | | |
|---|---|---|---|
| 7,750,505 B2 | 7/2010 | Ichikawa | |
| 8,008,801 B2 | 8/2011 | Fujino et al. | |
| 8,655,524 B2 | 2/2014 | Ichikawa | |
| 8,798,826 B2 | 8/2014 | Ichikawa | |
| 2011/0014501 A1* | 1/2011 | Scheucher | B60K 1/04 429/7 |
| 2011/0199053 A1* | 8/2011 | Minamiura | H01M 10/441 320/136 |
| 2013/0264975 A1 | 10/2013 | Kaita et al. | |

FOREIGN PATENT DOCUMENTS

| | | |
|---|---|---|
| EP | 2639099 | 8/2014 |
| EP | 2823987 A1 | 1/2015 |
| JP | 2010093871 | 4/2010 |
| JP | 2011030362 | 2/2011 |
| JP | 2011066972 | 3/2011 |
| KR | 1020070020695 | 2/2007 |

* cited by examiner

*Primary Examiner* — Thienvu Tran
*Assistant Examiner* — David M Stables
(74) *Attorney, Agent, or Firm* — Buckert Patent & Trademark Law Firm PC; John F. Buckert

(57) ABSTRACT

A power control system for adjusting an input power limit of a DC-DC voltage converter is provided. The system includes a microprocessor that determines an amount of output power being output by a battery pack, an amount of available power in the battery pack, and an amount of input power being input to the DC-DC voltage converter. The microprocessor determines an amount of power being provided to the DC-AC inverter based on the amount of output power being output by the battery pack and the amount of input power being input to the DC-DC voltage converter. The microprocessor decreases the input power limit of the DC-DC voltage converter if a sum of the amount of power being provided to the DC-AC inverter and the amount of input power being input to the DC-DC voltage converter is greater than the amount of available power in the battery pack.

13 Claims, 4 Drawing Sheets

POWER CONTROL SYSTEM AND METHOD FOR ADJUSTING AN INPUT POWER LIMIT OF A DC-DC VOLTAGE CONVERTER

BACKGROUND

The inventor herein has recognized a need for an improved system and a method for adjusting an input power limit of a DC-DC voltage converter.

SUMMARY

A power control system for adjusting an input power limit of a DC-DC voltage converter in accordance with an exemplary embodiment is provided. The power control system includes a battery pack having an anode and a cathode. The battery pack is adapted to generate a first voltage level between the anode and the cathode that is received by the DC-DC voltage converter and a DC-AC inverter. The power control system further includes a first voltage sensor adapted to generate a first voltage signal indicative of the first voltage level between the anode and the cathode of the battery pack. The power control system further includes a first current sensor adapted to generate a first current signal indicative of a total current level flowing from the battery pack. The power control system further includes a second current sensor adapted to generate a second current signal indicative of a current level flowing from the battery pack to the DC-DC voltage converter. The power control system further includes a temperature sensor adapted to generate a temperature signal indicative of a temperature of the battery pack. The power control system further includes a microprocessor operably coupled to the first voltage sensor, the first current sensor, the second current sensor, and the temperature sensor. The microprocessor is programmed to determine an amount of output power being output by the battery pack based on the first voltage signal and the first current signal. The microprocessor is further programmed to determine an amount of available power in the battery pack based on the first current signal and the temperature signal. The microprocessor is further programmed to determine an amount of input power being input to the DC-DC voltage converter from the battery pack based on the second current signal and the first voltage signal. The microprocessor is further programmed to determine an amount of power being provided to the DC-AC inverter based on the amount of output power being output by the battery pack and the amount of input power being input to the DC-DC voltage converter. The microprocessor is further programmed to decrease the input power limit of the DC-DC voltage converter if a sum of the amount of power being provided to the DC-AC inverter and the amount of input power being input to the DC-DC voltage converter is greater than the amount of available power in the battery pack.

A method for adjusting an input power limit of a DC-DC voltage converter in accordance with another exemplary embodiment is provided. The method includes providing a power control system having a battery pack, the DC-DC voltage converter, a DC-AC inverter, a first voltage sensor, a first current sensor, a second current sensor, a temperature sensor, and a microprocessor. The battery pack has an anode and a cathode. The microprocessor is operably coupled to the first voltage sensor, the first current sensor, the second current sensor, and the temperature sensor. The method further includes generating a first voltage level between the anode and the cathode of the battery pack that is received by the DC-DC voltage converter and the DC-AC inverter. The method further includes generating a first voltage signal indicative of the first voltage level between the anode and the cathode of the battery pack, utilizing the first voltage sensor. The method further includes generating a first current signal indicative of a total current level flowing from the battery pack, utilizing the first current sensor. The method further includes generating a second current signal indicative of a current level flowing from the battery pack to the DC-DC voltage converter, utilizing the second current sensor. The method further includes generating a temperature signal indicative of a temperature of the battery pack, utilizing the temperature sensor. The method further includes determining an amount of output power being output by the battery pack based on the first voltage signal and the first current signal, utilizing the microprocessor. The method further includes determining an amount of available power in the battery pack based on the first current signal and the temperature signal, utilizing the microprocessor. The method further includes determining an amount of input power being input to the DC-DC voltage converter from the battery pack based on the second current signal and the first voltage signal, utilizing the microprocessor. The method further includes determining an amount of power being provided to the DC-AC inverter based on the amount of output power being output by the battery pack and the amount of input power being input to the DC-DC voltage converter, utilizing the microprocessor. The method further includes decreasing the input power limit of the DC-DC voltage converter if a sum of the amount of power being provided to the DC-AC inverter and the amount of input power being input to the DC-DC voltage converter is greater than the amount of available power in the battery pack, utilizing the microprocessor.

DETAILED DESCRIPTION

Figure 1:
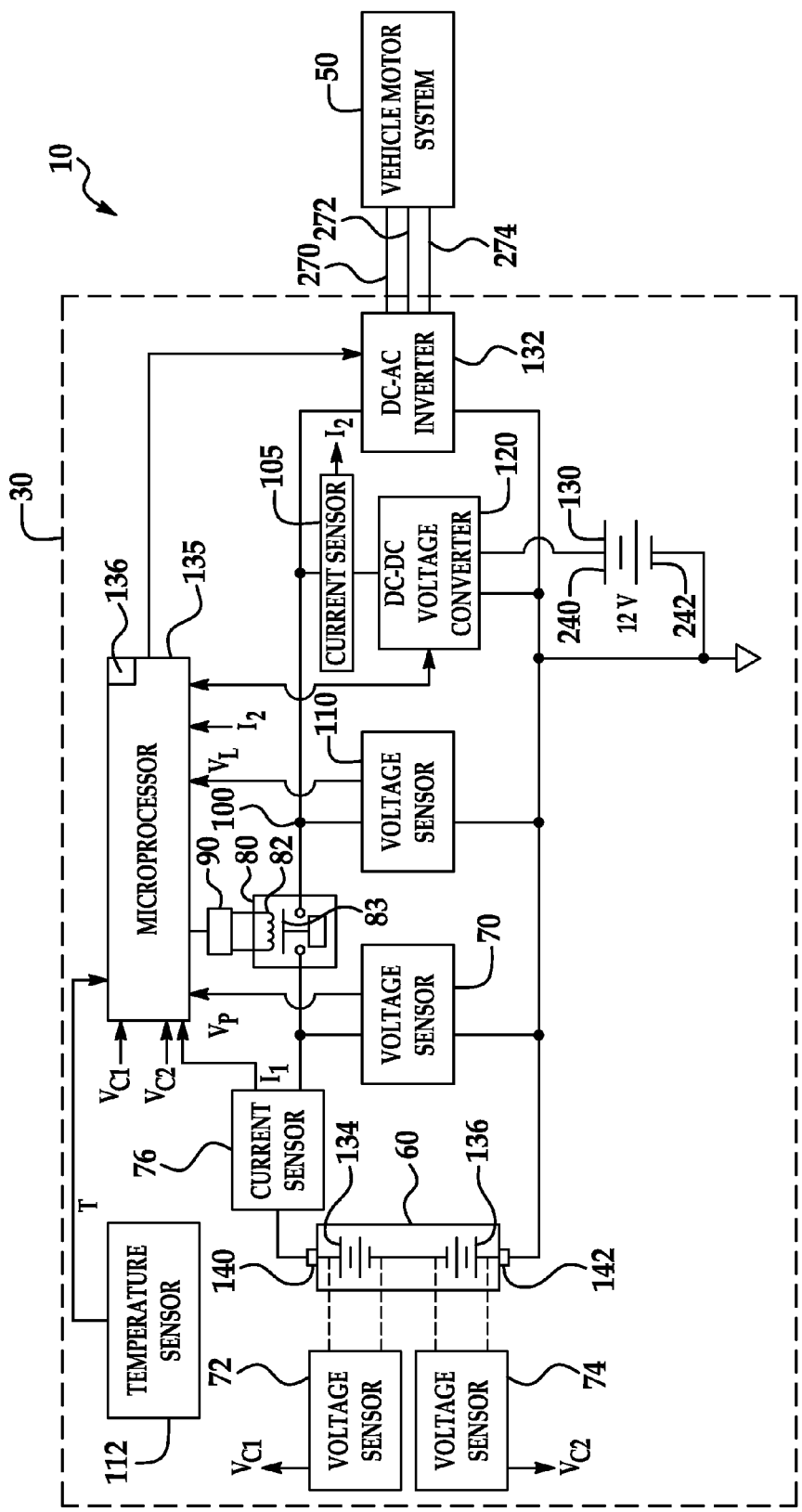
FIG. 1 is a schematic of an electric vehicle having a power control system and a vehicle motor system.
Figure 2:
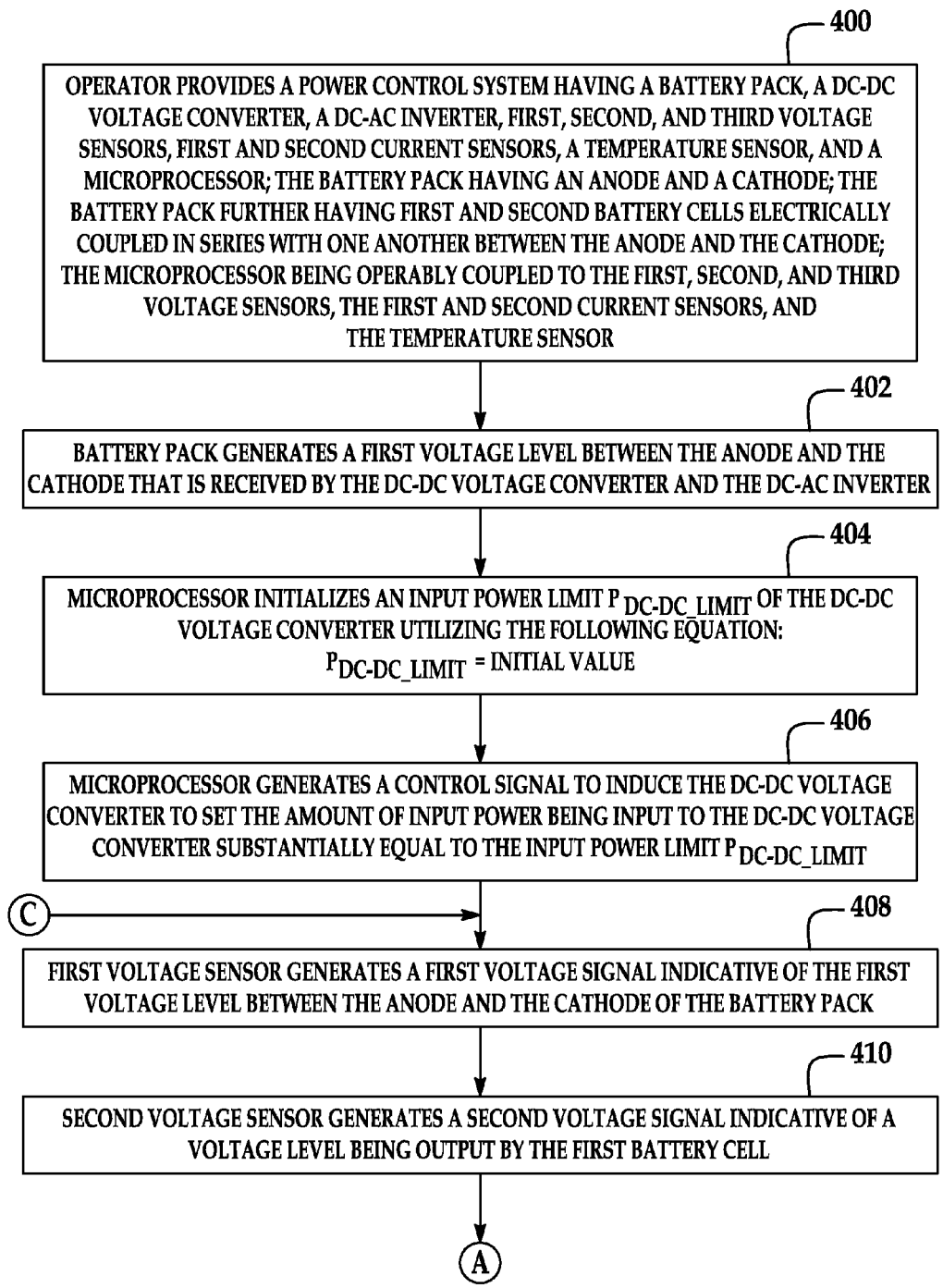
FIGS. 2-4 are flowcharts of a method for adjusting an input power limit of a DC-DC voltage converter of the power control system FIG. 1 in accordance with another exemplary embodiment.
Figure 3:
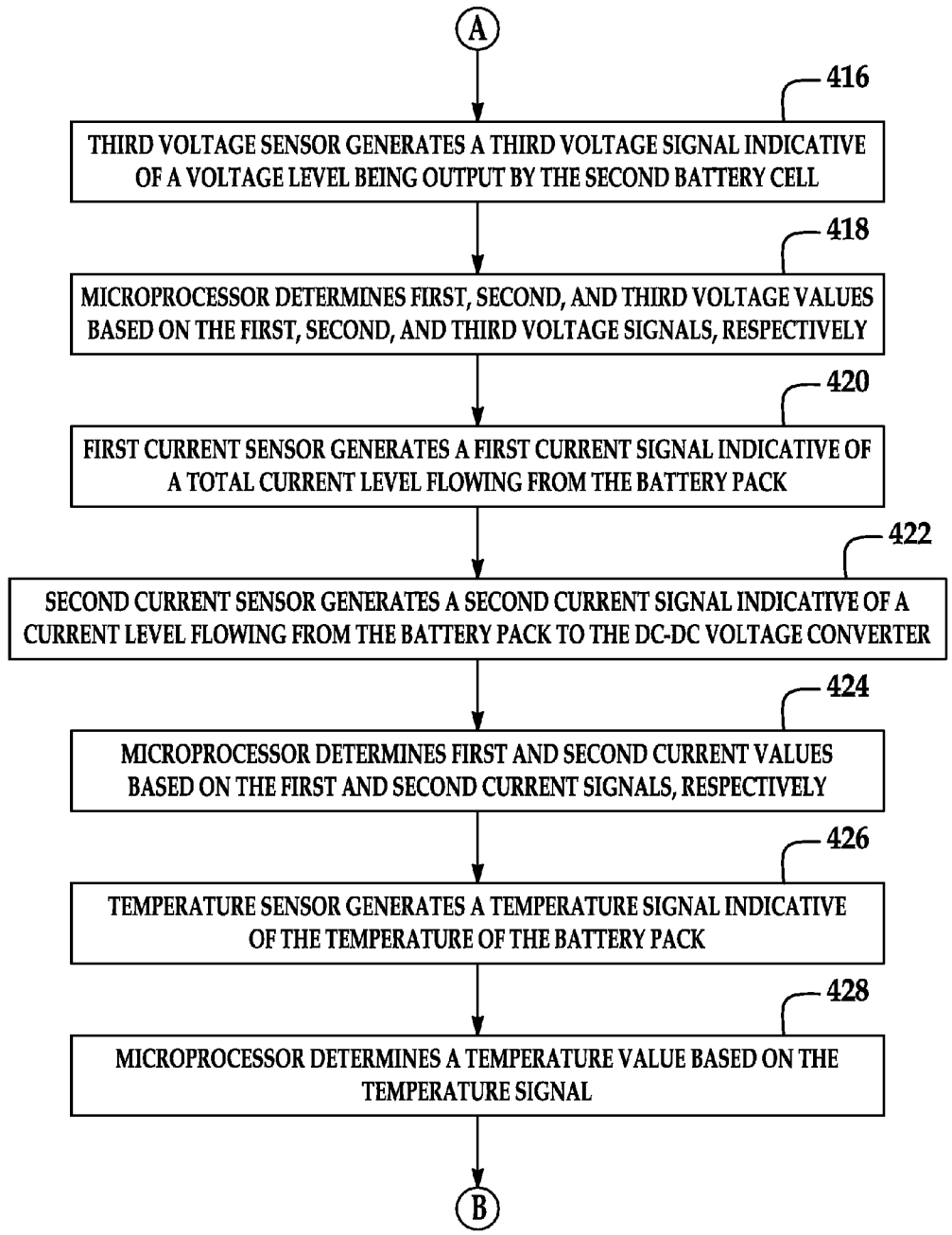
Figure 4:
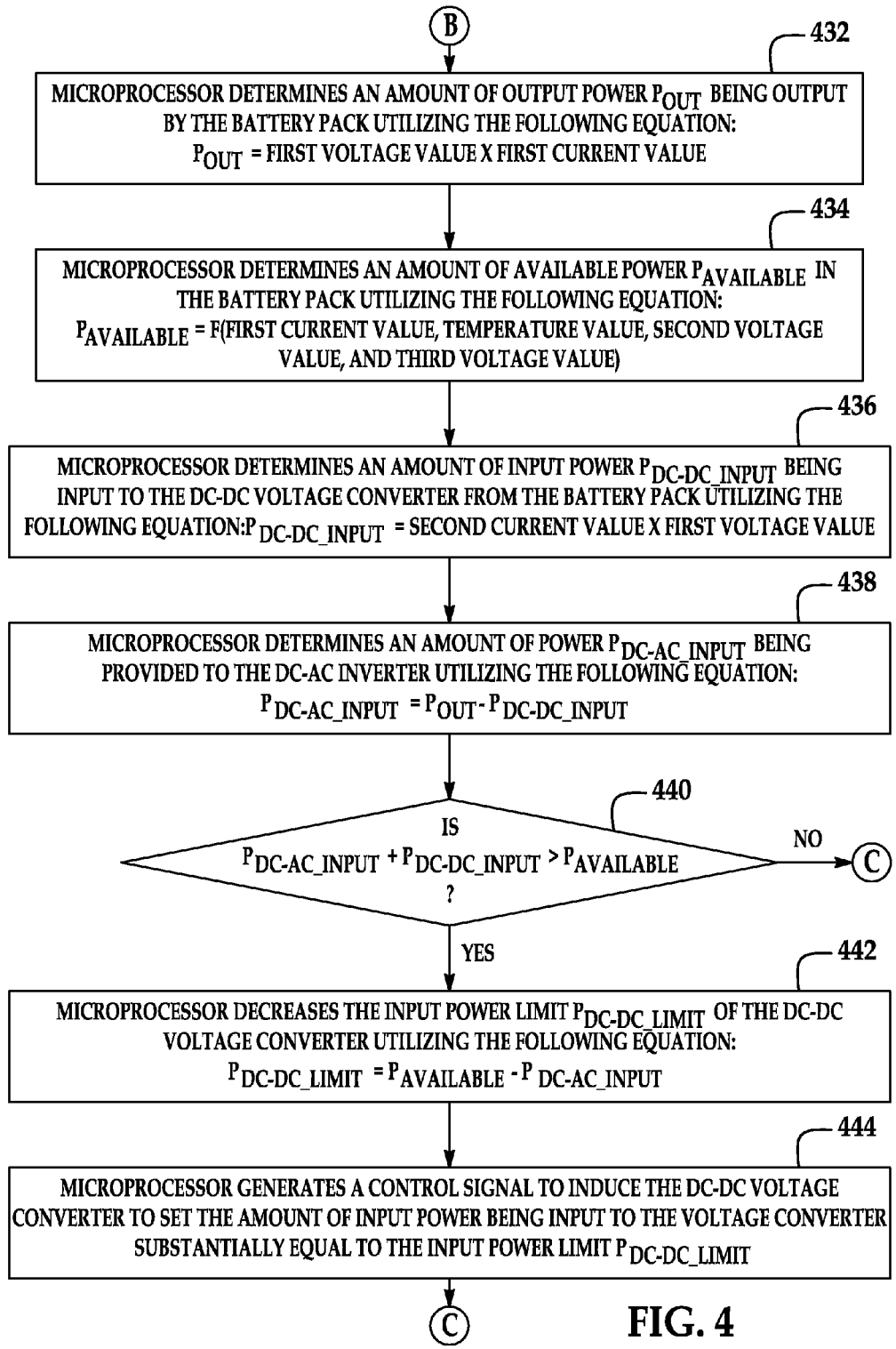

Referring to FIG. 1, an electric vehicle 10 having a power control system 30 in accordance with an exemplary embodiment and a vehicle motor system 50 is illustrated. An advantage of the power control system 30 is that the system 30 adjusts a power limit of a DC-DC voltage converter 120 based on the available power in a battery pack 60 and an amount of power being provided to a DC-AC inverter 132 which prevents the battery pack 60 from being damaged due to excessive power draw from the DC-DC voltage converter 120.

The power control system 30 includes the battery pack 60, a voltage sensor 70, a voltage sensor 72, a voltage sensor 74, a contactor 80, a contactor driver 90, an electrical node 100, a current sensor 105, a voltage sensor 110, a temperature sensor 112, the DC-DC voltage converter 120, and a battery 130.

The battery pack 60 has first and second battery cells 134, 136 electrically coupled in series with one another between an anode 140 and a cathode 142. The battery pack 60 is adapted to generate a first voltage level between the anode 140 and the cathode 142. The first battery cell 134 generates a second voltage level between an anode and a cathode thereof. Further, the second battery cell 136 generates a third voltage level between an anode and a cathode thereof. In an exemplary embodiment, the first and second battery cells 134, 136 are lithium-ion battery cells. Of course, in an alternative embodiment the first and second battery cells 134, 136 could comprise another type of battery cell such as a nickel-cadmium battery cell, a nickel-metal-hydride battery cell, or a lead acid battery cell for example. Further, in an exemplary embodiment, the battery pack 60 outputs substantially 48 volts DC (VDC). Of course, in an alternative embodiment, the battery pack 60 could output another voltage level. For example, the battery pack 60 could output a voltage in a range of 300-400 VDC, or in a range greater than 400 VDC. In an alternative embodiment, the battery pack 60 could have a plurality of additional battery cells electrically coupled to one another in series with the first and second battery cells 134, 136.

The voltage sensor 70 is electrically coupled in parallel with the battery pack 60, and further electrically coupled to the anode 140 and the cathode 142 of the battery pack 60. The voltage sensor 70 is adapted to generate a voltage signal ($V_P$) indicative of a voltage level output by the battery pack 60. The microprocessor 135 receives the voltage signal ($V_P$) from the voltage sensor 70 and determines a first voltage value based on the voltage signal ($V_P$).

The voltage sensor 72 is electrically coupled in parallel with the first battery cell 134. The voltage sensor 72 is adapted to generate a voltage signal ($V_{C1}$) indicative of a voltage level output by the first battery cell 134. The microprocessor 135 receives the voltage signal ($V_{C1}$) from the voltage sensor 72 and determines a second voltage value based on the voltage signal ($V_{C1}$).

The voltage sensor 74 is electrically coupled in parallel with the second battery cell 136. The voltage sensor 74 is adapted to generate a voltage signal ($V_{C2}$) indicative of a voltage level output by the second battery cell 136. The microprocessor 135 receives the voltage signal ($V_{C2}$) from the voltage sensor 74 and determines a third voltage value based on the voltage signal ($V_{C2}$).

The current sensor 76 is electrically coupled in series between the battery pack 60 and the contactor 80. The current sensor 76 is adapted to generate a current signal ($I_1$) indicative of a total current level being output by the battery pack 60. The microprocessor 135 receives the current signal ($I_1$) from the current sensor 76 and determines a first current value based on the current signal ($I_1$).

The contactor 80 is electrically coupled in series with and between the first anode 60 and the electrical node 100. The contactor 80 includes a contactor coil 82 and a contact 83. When the microprocessor 135 generates a control signal that is received by the contactor driver 90, the contactor driver 90 energizes the contactor coil 82 which moves the contact 83 to a closed operational position. Alternately, when the microprocessor 135 stops generating the control signal, the contactor driver 90 de-energizes the contactor coil 82 which moves the contact 83 to an open operational position.

The current sensor 105 is electrically coupled in series between the contactor 80 and the DC-DC voltage converter 120. The current sensor 105 is adapted to generate a current signal ($I_2$) indicative of a current level being input into the DC-DC voltage converter 120. The microprocessor 135 receives the current signal ($I_2$) from the current sensor 105 and determines a second current value based on the current signal ($I_2$).

The voltage sensor 110 is electrically coupled between and to the electrical node 100 and the cathode 142. The voltage sensor 110 is adapted to generate a voltage signal ($V_L$) indicative of a voltage level between the electrical node 100 and the cathode 142. The microprocessor 135 receives the voltage signal ($V_L$) from the voltage sensor 110 and determines a voltage value based on the voltage signal ($V_L$). If the voltage signal ($V_L$) is substantially equal to the voltage signal ($V_P$), the contact 83 is operating as desired.

The temperature sensor 112 is disposed proximate to the battery pack 60. The temperature sensor 112 is adapted to generate a temperature signal (T) indicative of a temperature level of the battery pack 60. The microprocessor 135 receives the temperature signal (T) from the temperature sensor 112 and determines a temperature value based on the voltage signal (T).

The DC-DC voltage converter 120 is electrically coupled between and to the electrical node 100 and the cathode 142. The DC-DC voltage converter 120 is further electrically coupled to the anode 240 of the battery 130. The DC-DC voltage converter 120 is provided to output a voltage level between the electrical node 100 and the cathode 142 that is greater than a voltage level output by the battery 130, utilizing the voltage level output by the battery 130.

The battery 130 has an anode 240 and a cathode 242 and is utilized to provide power to auxiliary vehicle devices. The anode 240 is electrically coupled to the DC-DC voltage converter 120. In an exemplary embodiment, the cathode 242 is electrically coupled to the cathode 142 such that the cathode 242 and the cathode 142 have a common electrical ground. In an alternative embodiment, the cathode 242 is not electrically coupled to the cathode 142 such that the cathode 242 and the cathode 142 do not have a common electrical ground. The battery 130 is adapted to generate a voltage level between the anode 240 and the cathode 242 which is less than a voltage level output by the battery pack 60. In an exemplary embodiment, the battery 130 is a lead acid battery. Of course, in an alternative embodiment the battery 130 could comprise another type of battery such as a nickel-cadmium battery, a nickel-metal-hydride battery, or a lithium-ion battery for example. Further, in an exemplary embodiment, the battery 130 outputs substantially 12 VDC. Of course, in an alternative embodiment, the battery 130 could output another voltage level.

The DC-AC inverter 132 is electrically coupled between and to the electrical node 100 and the cathode 142 and provides AC power to the vehicle motor system 50. Further, the DC-AC inverter 132 is electrically coupled to the vehicle motor system 50 via the electrical lines 270, 272, 274. Still further, the DC-AC inverter 132 operably communicates with the microprocessor 135. When the contact 83 has the closed operational position, the DC-AC inverter 132 receives a voltage level from the battery pack 60. Further, the microprocessor 135 generates a control signal to induce the DC-AC inverter to output AC voltages on the electrical lines 270, 272, 274 to induce the vehicle motor system 50 to output a desired torque amount.

The microprocessor 135 is operably coupled to the voltage sensor 70, the voltage sensor 72, the voltage sensor 74, the current sensor 76, the current sensor 105, the voltage sensor 110, the temperature sensor 112, the DC-DC voltage converter 120, and the DC-AC inverter 132. The microprocessor 135 operably communicates with a memory device 136 and stores data and operational instructions in the memory device 136. The microprocessor 135 is programmed to perform operational steps which will be described in greater detail below.

Referring to FIGS. 1-4, a flowchart of a method for adjusting an input power limit of the DC-DC voltage converter 120 in accordance with another exemplary embodiment will now be described. For the following method, it is assumed that the contact 83 has a closed operational position in response to a control signal from the microprocessor 135.

At step 400, an operator provides the power control system 30 having the battery pack 60, the DC-DC voltage converter 120, the DC-AC inverter 132, voltage sensors 70, 72, 74, current sensors 76, 105, the temperature sensor 112, and the microprocessor 135. The battery pack 60 has the anode 140 and the cathode 142. The battery pack 60 further includes first and second battery cells 134, 136 electrically coupled in series with one another between the anode 140 and the cathode 142. The microprocessor 135 is operably coupled to the voltage sensors 70, 72, 74, the current sensors 76, 105, and the temperature sensor 112.

At step 402, the battery pack 60 generates a first voltage level between the anode 140 and the cathode 142 that is received by the DC-DC voltage converter 120 and the DC-AC inverter 132.

At step 404, the microprocessor 135 initializes an input power limit $P_{DC\text{-}DC\_LIMIT}$ of the DC-DC voltage converter 120 utilizing the following equation: $P_{DC\text{-}DC\_LIMIT}$=initial value.

At step 406, the microprocessor 135 generates a control signal to induce the DC-DC voltage converter 120 to set the amount of input power being input to the DC-DC voltage converter 120 substantially equal to the input power limit $P_{DC\text{-}DC\_LIMIT}$.

At step 408, the voltage sensor 70 generates a first voltage signal ($V_P$) indicative of the first voltage level between the anode 140 and the cathode 142 of the battery pack 60.

At step 410, the voltage sensor 72 generates a second voltage signal ($V_{C1}$) indicative of a voltage level being output by the first battery cell 134.

At step 416, the voltage sensor 74 generates a third voltage signal ($V_{C2}$) indicative of a voltage level being output by the second battery cell 136.

At step 418, the microprocessor 135 determines first, second, and third voltage values based on the first, second, and third voltage signals ($V_P$, $V_{C1}$, $V_{C2}$), respectively.

At step 420, the current sensor 76 generates a first current signal ($I_1$) indicative of a total current level flowing from the battery pack 60.

At step 422, the current sensor 105 generates a second current signal ($I_2$) indicative of a current level flowing from the battery pack 60 to the DC-DC voltage converter 120.

At step 424, the microprocessor 135 determines first and second current values based on the first and second current signals (412), respectively.

At step 426, the temperature sensor 112 generates a temperature signal (T) indicative of a temperature of the battery pack 60.

At step 428, the microprocessor 135 determines a temperature value based on the temperature signal (T).

At step 432, the microprocessor 135 determines an amount of output power $P_{OUT}$ being output by the battery pack 60 utilizing the following equation: $P_{OUT}$=first voltage value × first current value.

At step 434, the microprocessor 135 determines an amount of available power $P_{AVAILABLE}$ in the battery pack 60 utilizing the following equation: $P_{AVAILABLE}$=f(first current value, temperature value, second voltage value, and third voltage value), wherein f corresponds to a predetermined function. In an alternative embodiment, f corresponds to a lookup table stored in the memory device 136 that utilizes the first current value, temperature value, second voltage value, and third voltage value, to look up an associated $P_{AVAILABLE}$ value.

At step 436, the microprocessor 135 determines an amount of input power $P_{DC\text{-}DC\_INPUT}$ being input to the DC-DC voltage converter 120 from the battery pack 60 utilizing the following equation: $P_{DC\text{-}DC\_INPUT}$=second current value×first voltage value.

At step 438, the microprocessor 135 determines an amount of power $P_{DC\text{-}AC\_INPUT}$ being provided to the DC-AC inverter 132 utilizing the following equation: $P_{DC\text{-}AC\_INPUT}=P_{OUT}-P_{DC\text{-}DC\_INPUT}$.

At step 440, the microprocessor 135 makes a determination as to whether $P_{DC\text{-}AC\_INPUT}+P_{DC\text{-}DC\_INPUT}$ is greater than $P_{AVAILABLE}$. If the value of step 135 equals "yes", the method advances to step 442. Otherwise, the method returns to step 408.

At step 442, the microprocessor 135 decreases the input power limit $P_{DC\text{-}DC\_LIMIT}$ of the DC-DC voltage converter 120 utilizing the following equation: $P_{DC\text{-}DC\_LIMIT}=P_{AVAILABLE}-P_{DC\text{-}AC\_INPUT}$.

At step 444, the microprocessor 35 generates a control signal to induce the DC-DC voltage converter 120 to set the amount of input power being input to the DC-DC voltage converter 120 substantially equal to the input power limit $P_{DC\text{-}DC\_LIMIT}$. After step 444, the method returns to step 408.

The above-described method can be at least partially embodied in the form of one or more memory devices or computer readable media having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more computers or microprocessors, the one or more computers or microprocessors become an apparatus programmed to practice the associated steps of the method.

The power control system and the method described herein provide a substantial advantage over other systems and methods. In particular, the power control system and the method provide a technical effect of adjusting a power limit of the DC-DC voltage converter 120 based on the available power in the battery pack 60 and the amount of power being provided to the DC-AC inverter 132 which prevents the battery pack 60 from being damaged due to excessive power draw from the DC-DC voltage converter 120.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A power control system for adjusting an input power limit of a DC-DC voltage converter, comprising:
   a battery pack having a positive electrode and a negative electrode, the battery pack adapted to generate a first voltage level between the positive electrode and the negative electrode of the battery pack;
   a contactor having a contact, the contact being electrically coupled to the positive electrode of the battery pack when the contactor has a closed operational position, the contact being further electrically coupled to a first electrical node when the contactor has the closed operational position such that the first voltage level is received by the DC-DC voltage converter and the DC-AC inverter;

a first voltage sensor adapted to generate a first voltage signal indicative of the first voltage level between the positive electrode and the negative electrode of the battery pack;

a first current sensor adapted to generate a first current signal indicative of a total current level flowing from the battery pack;

a second current sensor being electrically coupled to and between the first electrical node and the DC-DC voltage converter; the DC-DC voltage converter being further electrically coupled to the negative electrode of the battery pack, the second current sensor adapted to generate a second current signal indicative of a current level flowing through the DC-DC voltage converter;

a temperature sensor adapted to generate a temperature signal indicative of a temperature of the battery pack;

a microprocessor operably coupled to the first voltage sensor, the first current sensor, the second current sensor, and the temperature sensor; the microprocessor being programmed to determine an amount of output power being output by the battery pack based on the first voltage signal and the first current signal;

the microprocessor being further programmed to determine an amount of available power in the battery pack based on the first current signal and the temperature signal;

the microprocessor being further programmed to determine an amount of input power being input to the DC-DC voltage converter from the battery pack based on the second current signal and the first voltage signal;

the microprocessor being further programmed to determine an amount of power being provided to the DC-AC inverter by subtracting the amount of input power being input to the DC-DC voltage converter from the amount of output power being output by the battery pack; and the microprocessor being further programmed to decrease the input power limit of the DC-DC voltage converter if a sum of the amount of power being provided to the DC-AC inverter and the amount of input power being input to the DC-DC voltage converter is greater than the amount of available power in the battery pack.

2. The power control system of claim 1, wherein the microprocessor being further programmed to decrease the input power limit of the DC-DC voltage converter by setting the input power limit substantially equal to the amount of available power in the battery pack minus the amount of power being provided to the DC-AC inverter.

3. The power control system of claim 1, wherein the microprocessor being further programmed to generate a control signal to induce the DC-DC voltage converter to set the amount of input power being input to the DC-DC voltage converter substantially equal to the input power limit of the DC-DC voltage converter.

4. The power control system of claim 1, wherein the microprocessor being programmed to determine the amount of output power being output by the battery pack by:
determining a voltage value based on the first voltage signal;
determining a current value based on the first current signal; and
multiplying the voltage value by the current value to obtain the amount of output power being output by the battery pack.

5. The power control system of claim 1, wherein the microprocessor being programmed to determine the amount of input power being input to the DC-DC voltage converter from the battery pack by:
determining a voltage value based on the first voltage signal;
determining a current value based on the second current signal; and
multiplying the voltage value by the current value to obtain the amount of input power being input to the DC-DC voltage converter.

6. The power control system of claim 1, wherein the battery pack has first and second battery cells electrically coupled in series with one another, and the power control system further includes second and third voltage sensors electrically coupled to the first and second battery cells, respectively;
the second voltage sensor adapted to generate a second voltage signal indicative of a voltage level being output by the first battery cell;
the third voltage sensor adapted to generate a third voltage signal indicative of a voltage level being output by the second battery cell; and
the microprocessor being further programmed to determine the amount of available power in the battery pack based on the first current signal, the temperature signal, the second voltage signal, and the third voltage signal.

7. A method for adjusting an input power limit of a DC-DC voltage converter, comprising:
providing a power control system having a battery pack, the DC-DC voltage converter, a DC-AC inverter, a first voltage sensor, a first current sensor, a second current sensor, a temperature sensor, and a microprocessor; the battery pack having a positive electrode and a negative electrode; the microprocessor being operably coupled to the first voltage sensor, the first current sensor, the second current sensor, and the temperature sensor;
generating a first voltage level between the positive electrode and the negative electrode of the battery pack that is received by the DC-DC voltage converter and the DC-AC inverter;
generating a first voltage signal indicative of the first voltage level between the positive electrode and the negative electrode of the battery pack, utilizing the first voltage sensor;
generating a first current signal indicative of a total current level flowing from the battery pack, utilizing the first current sensor;
generating a second current signal indicative of a current level flowing from the battery pack to the DC-DC voltage converter, utilizing the second current sensor;
generating a temperature signal indicative of a temperature of the battery pack, utilizing the temperature sensor;
determining an amount of output power being output by the battery pack based on the first voltage signal and the first current signal, utilizing the microprocessor;
determining an amount of available power in the battery pack based on the first current signal and the temperature signal, utilizing the microprocessor;
determining an amount of input power being input to the DC-DC voltage converter from the battery pack based on the second current signal and the first voltage signal, utilizing the microprocessor;

determining an amount of power being provided to the DC-AC inverter b subtracting the amount of input power being input to the DC-DC voltage converter from the amount of output power being output by the battery pack, utilizing the microprocessor; and decreasing the input power limit of the DC-DC voltage converter if a sum of the amount of power being provided to the DC-AC inverter and the amount of input power being input to the DC-DC voltage converter is greater than the amount of available power in the battery pack, utilizing the microprocessor.

8. The method of claim 7, wherein decreasing the input power limit of the DC-DC voltage converter comprises setting the input power limit substantially equal to the amount of available power in the battery pack minus the amount of power being provided to the DC-AC inverter, utilizing the microprocessor.

9. The method of claim 7, further comprising generating a control signal to induce the DC-DC voltage converter to set the amount of input power being input to the DC-DC voltage converter substantially equal to the input power limit of the DC-DC voltage converter, utilizing the microprocessor.

10. The method of claim 7, wherein determining the amount of output power being output by the battery pack comprises:
   determining a voltage value based on the first voltage signal;
   determining a current value based on the first current signal; and
   multiplying the voltage value by the current value to obtain the amount of output power being output by the battery pack.

11. The method of claim 7, wherein determining the amount of input power being input to the DC-DC voltage converter from the battery pack comprises:
   determining a voltage value based on the first voltage signal;
   determining a current value based on the second current signal; and
   multiplying the voltage value by the current value to obtain the amount of input power being input to the DC-DC voltage converter.

12. The method of claim 7, wherein the battery pack has first and second battery cells electrically coupled in series with one another, and the power control system further includes second and third voltage sensors electrically coupled to the first and second battery cells, respectively; the method further comprising:
   generating a second voltage signal indicative of a voltage level being output by the first battery cell, utilizing the second voltage sensor;
   generating a third voltage signal indicative of a voltage level being output by the second battery cell, utilizing the third voltage sensor; and
   determining the amount of available power in the battery pack based on the first current signal, the temperature signal, the second voltage signal, and the third voltage signal, utilizing the microprocessor.

13. A power control system for adjusting an input power limit of a DC-DC voltage converter, comprising:
   a battery pack having a positive electrode and a negative electrode, the battery pack adapted to generate a first voltage level between the positive electrode and the negative electrode that is received by the DC-DC voltage converter and a DC-AC inverter;
   a first voltage sensor adapted to generate a first voltage signal indicative of the first voltage level between the positive electrode and the negative electrode of the battery pack;
   a first current sensor adapted to generate a first current signal indicative of a total current level flowing from the battery pack;
   a second current sensor adapted to generate a second current signal indicative of a current level flowing from the battery pack to the DC-DC voltage converter;
   a temperature sensor adapted to generate a temperature signal indicative of a temperature of the battery pack;
   a microprocessor operably coupled to the first voltage sensor, the first current sensor, the second current sensor, and the temperature sensor; the microprocessor being programmed to determine an amount of output power being output by the battery pack based on the first voltage signal and the first current signal;
   the microprocessor being further programmed to determine an amount of available power in the battery pack based on the first current signal and the temperature signal;
   the microprocessor being further programmed to determine an amount of input power being input to the DC-DC voltage converter based on the second current signal and the first voltage signal;
   the microprocessor being further programmed to determine an amount of power being provided to the DC-AC inverter by subtracting the amount of input power being input to the DC-DC voltage converter from the amount of output power being output by the battery pack; and
   the microprocessor being further programmed to decrease the input power limit of the DC-DC voltage converter if a sum of the amount of power being provided to the DC-AC inverter and the amount of input power being input to the DC-DC voltage converter is greater than the amount of available power in the battery pack.

* * * * *